No. 851,101. PATENTED APR. 23, 1907.
T. H. O'BRIEN.
TICKET OR TAG.
APPLICATION FILED JULY 24, 1905.

2 SHEETS—SHEET 1.

Fig. 2ª

Witnesses:
H. T. McVean
L. L. Burket

Inventor:
Thomas H. O'Brien,
By Sans Bagger & Co.
Attorneys

No. 851,101. PATENTED APR. 23, 1907.
T. H. O'BRIEN.
TICKET OR TAG.
APPLICATION FILED JULY 24, 1905.
2 SHEETS—SHEET 2.
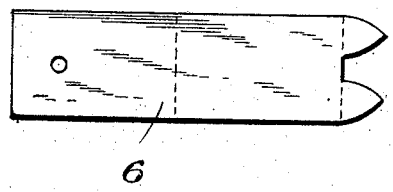
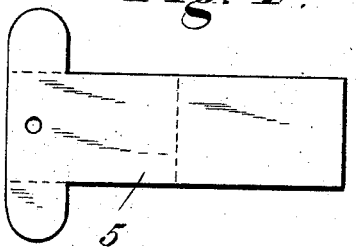
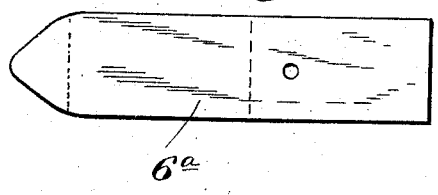
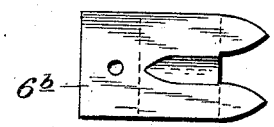
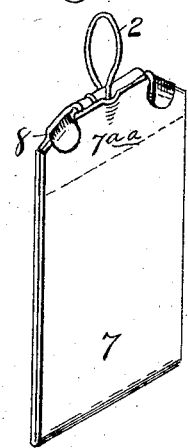
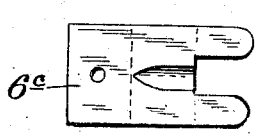
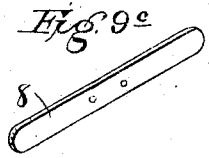
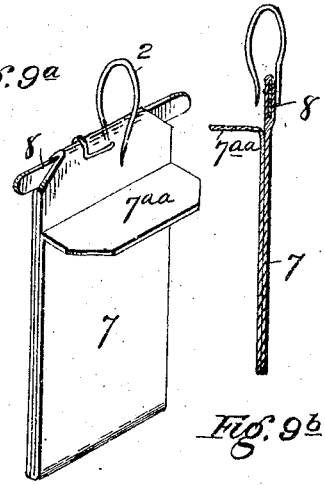
Witnesses:
H. T. McKeever
L. L. Burket
Inventor:
Thomas H. O'Brien,
By Louis Bagger & Co
Attorneys

UNITED STATES PATENT OFFICE.

THOMAS H. O'BRIEN, OF FOND DU LAC, WISCONSIN.

TICKET OR TAG.

No. 851,101.　　　Specification of Letters Patent.　　　Patented April 23, 1907.

Application filed July 24, 1905. Serial No. 271,075.

*To all whom it may concern:*

Be it known that I, THOMAS H. O'BRIEN, a citizen of the United States, residing at Fond du Lac, in the county of Fond du Lac and State of Wisconsin, have invented new and useful Improvements in Tickets or Tags, of which the following is a specification.

My invention relates to improvements in tickets or tags particularly adapted for attaching or affixing to dry goods in the piece or other object.

Said invention has for its object to provide for concealing or isolating the point of the attaching or affixing pin or fastening to guard against the contact of the hands therewith in handling the goods bearing the tag or ticket, and to accomplish the foregoing ends in a simple, expeditious and effective manner.

Said invention consists of certain structural features substantially as hereinafter fully disclosed and particularly pointed out by the claims.

Figure 1:
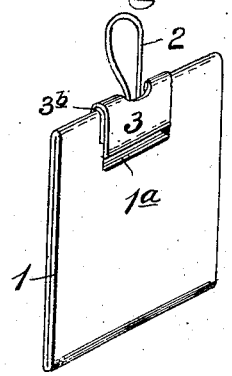
Figure 2:
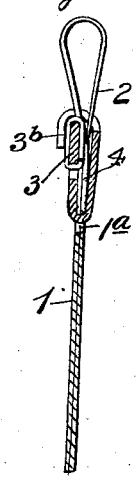
Figure 3:
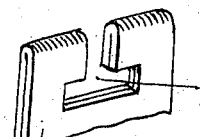
Figure 3:
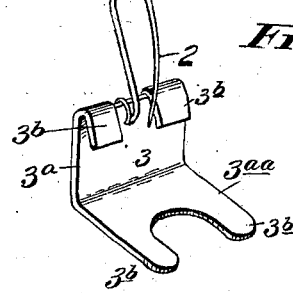
Figure 4:
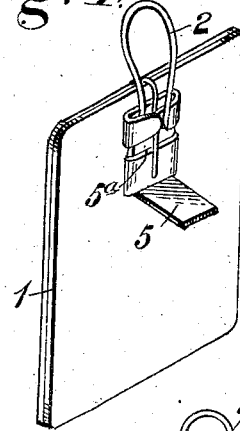

In the accompanying drawing illustrating the preferred embodiment of my invention Figure 1 is a perspective view thereof. Fig. 2 is a vertical section of the same, produced centrally therethrough. Fig. 2$^a$ is a fragmentary view of the ticket, with the metallic clasp and suspending pin-loop removed, disclosing fully the form of the slot in said ticket through which the clasp passes. Fig. 3 is a detached view of the clasp extended. Figs. 4, 5, 6, 7, 8 and 9 are several modifications of the invention. Figs. 4$^a$, 5$^a$, 6$^a$, 7$^a$, and 8$^a$ are views disclosing the respective blanks of the clasps or shields shown in the aforesaid figures to more fully show their structure with the exception of Fig. 9. Fig. 9$^a$ is a perspective view of the form of the invention as disclosed by Fig. 9, with the flap extended, as also the clasps therefor. Fig. 9$^b$ is a sectional elevation thereof produced at one side of the attaching pin-loop, with the latter in side view. Fig. 9$^c$ is a detached perspective of the clasp - forming metal-strip of the tag.

In the carrying out my invention, I provide a tag or ticket 1 of suitable material, as card-board, paste-board and the like, for receiving the data or memoranda to identify or mark the roll or piece of dry-goods or other object to which the ticket or tag may be attached.

An attaching or suspending means preferably in the form of a looped pin 2, taking the place of a piece of string ordinarily used for the purpose, is used herein for connecting the tag or ticket to the goods or article. Said suspending loop or means is preferably of wire, having one end suitably passed through and lapped around the upper edge of a clasp 3 applied to the ticket or tag.

The clasp 3, which is of preferably soft sheet or ductile metal, is passed through a slot or opening 1$^a$ in the ticket or tag, near the upper edge of the latter, with its thus formed opposite portions or halves 3$^a$, 3$^{aa}$ lying flat upon opposite sides of the tag or ticket. The upper edges of said portions or halves 3$^a$, 3$^{aa}$ are provided with duplicate lug-like-extensions 3$^b$, those of one-half or portion being bent over the upper edge of the ticket or tag and those of the other half or portion being bent over the aforesaid extensions, upon opposite sides of the ticket or tag, respectively, the upper edges of said portions 3$^a$, 3$^{aa}$ themselves, however, reaching clear to the corresponding edge of the ticket or tag. This is particularly so with that half or portion of the shield or clasp 3 arranged or fitting upon the front side of the ticket, or that side through which the pin-loop point projects, in order, as is obvious, to conceal or isolate the latter, to guard against the same puncturing or tearing the hands in handling the goods bearing the tag or ticket.

It will be noted that the tag or ticket is preferably cut away or removed at a point opposite where the pin-loop point passes through the clasp-back, as at 4 permitting the front portion of the clasp to rest directly in contact with said point, as well as the inner-end securing portion of the pin-loop. By this arrangement it is also noted that the clasp may be readily bent or extended from over the pin-loop point and the latter be accordingly manipulated so as to be withdrawn from the goods or object and thus be detached from the same together with the ticket or tag.

In the modification as exemplified by Figs. 4 and 4$^a$ a clasp 5 is employed, with one portion passed or inserted under a single thickness of the tag or ticket, it being passed through slits 5$^a$ produced at short intervals apart in said thickness, and the outstanding or projecting portions of said clasp interlapping and overlapping one another.

Figure 5:
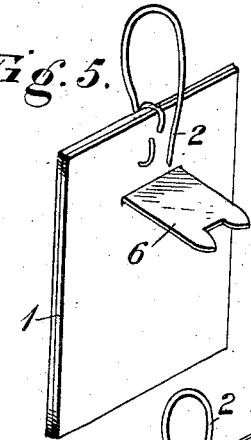
Figure 6:
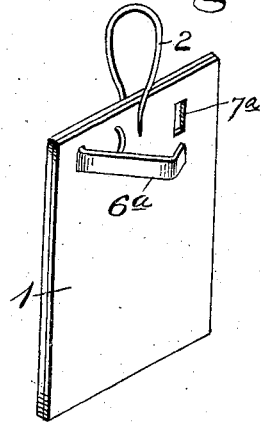
Figure 7:
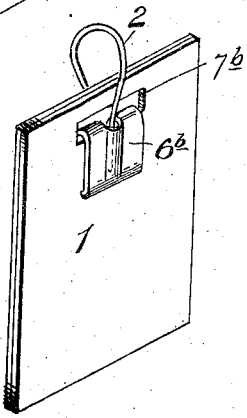
Figure 8:
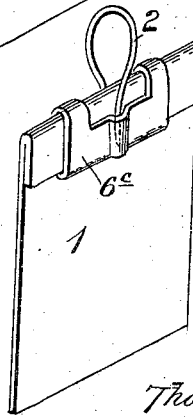

In the modifications as shown by Figs. 5, 5$^a$, 6, 6$^a$, 7, 7$^a$ and 8, 8$^a$, the leading characteristic thereof is that the clasps 6, 6ª, 6ᵇ, 6ᶜ, thereof have, each, one edge tucked into the ticket, in under one thickness thereof, contiguous to the secured inner end of the pin-loop and its point. In Figs. 5, 5ª and 8, 8ª the lug-extensions are carried over the upper edge of the tag or ticket and clasped upon its back. In Figs. 6, 6ª and 7, 7ª the lug-extensions are passed or tucked through slots 7ª, 7ᵇ respectively and clasped upon its back.

As disclosed by the modification of Figs. 9 9ª, 9ᵇ, 9ᶜ, I may use, in lieu of any of the aforesaid forms of my invention, a tag proper 7, with one thickness thereof disconnected therefrom a suitable distance to form a flap 7ᵃᵃ. Between two other thicknesses of the tag proper is held a transverse metal-strip 8, with its projecting end portions effective to form clasps adapted to be bent upon, and secure the flap 7ᵃᵃ down over the point of the pin-loop practically as aforesaid, the latter being passed and looped through the tag proper and said clasp-forming metal-strip, thus effectively holding or securing said metal-strip in place, as well as the pin-loop, to the tag.

I claim:

1. A device of the character described, having a ticket or tag, a wire or metallic pin-loop for suspending said tag or ticket in position, and a clasp applied to said tag or ticket and effective to guard the point of said pin-loop, the forming-wire of the latter being looped upward for insertion through the article to be labeled and having its free end or point depending to a point below the upper end of said ticket.

2. A device of the character described, having a ticket or tag a pin-loop for suspending said ticket or tag in position upon the article for labeling, and a clasp applied to said tag or ticket and effective to conceal or isolate the point of said pin-loop, said clasp having said pin-loop passing therethrough.

3. A device of the character described, having a ticket or tag, a pin-loop for suspending said ticket or tag in position upon the article for labeling and a clasp passed through said ticket and having its thus formed respective end-portions provided with lug-extensions bent upon an edge of the ticket and clasping the front surface of the latter, said clasp having said pin-loop passing therethrough.

4. A device of the character described, having a pin-loop effective for suspending a ticket or tag from an article for labeling or tagging, and a clasp having passing therethrough said pin-loop, and provided with lug-extensions for securing it upon said ticket or tag.

5. A tag or ticket adapted to be suspended from the article to which it may be applied, whose suspending means comprises an upward looped wire terminating practically in a pin, and means effective of attachment to said ticket or tag, for guarding the pin-point.

6. A tag or ticket adapted to be suspended from the article to which it may be applied, whose suspending means comprises an upward looped wire terminating practically in a pin, and a clasp effective of attachment to said ticket or tag, for guarding the pin-point.

In testimony whereof I affix my signature, in presence of two subscribing witnesses.

THOMAS H. O'BRIEN.

Witnesses:
F. W. CHADBOURNE,
TESSIE NORMILE.